(12) United States Patent
Iyengar

(10) Patent No.: US 12,036,977 B2
(45) Date of Patent: Jul. 16, 2024

(54) DETERMINING A DISTANCE BETWEEN A CAMERA AND A HITCH BALL

(71) Applicant: Robert Bosch GmbH, Stuttgart (DE)

(72) Inventor: Srivathsan Sridharan Iyengar, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 17/568,379

(22) Filed: Jan. 4, 2022

(65) Prior Publication Data
US 2023/0211773 A1 Jul. 6, 2023

(51) Int. Cl.
*G06T 7/00* (2017.01)
*B60W 30/06* (2006.01)
(Continued)

(52) U.S. Cl.
CPC ...... *B60W 30/06* (2013.01); *B60W 30/18036* (2013.01); *G06T 7/20* (2013.01);
(Continued)

(58) Field of Classification Search
CPC .......... B60W 30/06; B60W 30/18036; B60W 2530/203; B60W 2554/802; B60W 2554/801; B60W 2420/42; B60W 2520/06; B60W 2520/22; G06T 7/70; G06T 7/20; G06T 2207/30252; G06V 20/56
(Continued)

(56) References Cited

U.S. PATENT DOCUMENTS 6,970,184 B2 11/2005 Hirama et al.
9,374,562 B2 6/2016 Trombley et al.
(Continued)

FOREIGN PATENT DOCUMENTS

WO 2020079092 A1 4/2020

*Primary Examiner* — Tiffany P Ohman
(74) *Attorney, Agent, or Firm* — Michael Best & Friedrich LLP

(57) ABSTRACT

A system for determining a distance between a camera and a hitch ball of a vehicle. The system includes a camera configured to be mounted on a vehicle and an electronic processor connected to the camera. The electronic processor is configured to determine a first position and a second position associated with a point on a trailer, determine an angle of rotation between the first position and the second position, and using the first position, the second position, and the angle of rotation, determine a null space of a matrix. In one example, the matrix is $$A = \begin{bmatrix} 1 & 0 & 0 & -cu_{xo} & cl_x \\ 0 & 1 & 0 & -cu_{yo} & cl_y \\ 0 & 0 & 0 & cu_{zo} & -cl_z \\ 0 & 0 & 1 & \frac{-cu_{zo}}{cu_{z1}}cu_{x1} & cl_x \\ -\cos\delta & \sin\delta & 1 & 0 & 0 \end{bmatrix}$$

and the null space of the matrix includes a value of a distance ($d_l$) between the camera and the hitch ball. The electronic processor is further configured to perform an autonomous or semi-autonomous vehicle operation based on the distance ($d_l$) between the camera and the hitch ball.

19 Claims, 5 Drawing Sheets

(51) Int. Cl.
*B60W 30/18* (2012.01)
*G06T 7/70* (2017.01)
*G06V 20/56* (2022.01)
*G06T 7/20* (2017.01)

(52) U.S. Cl.
CPC ............... *G06T 7/70* (2017.01); *G06V 20/56* (2022.01); *B60W 2420/42* (2013.01); *B60W 2520/06* (2013.01); *B60W 2520/22* (2013.01); *B60W 2530/203* (2020.02); *B60W 2554/801* (2020.02); *B60W 2554/802* (2020.02); *G06T 2207/30252* (2013.01)

(58) Field of Classification Search
USPC .......................................................... 701/25
See application file for complete search history.

(56) References Cited

U.S. PATENT DOCUMENTS

| | | |
|---|---|---|
| 10,780,752 B1 | 9/2020 | Niewiadomski et al. |
| 10,984,553 B2 | 4/2021 | Ramirez Llanos |
| 2019/0265723 A1 | 8/2019 | Kotteri et al. |
| 2019/0308473 A1 | 10/2019 | Yu et al. |
| 2020/0298639 A1 | 9/2020 | Niewiadomski et al. |
| 2021/0023997 A1 | 1/2021 | Vasoya |
| 2022/0134951 A1* | 5/2022 | Zhang ...................... B60R 1/26 348/148 |

* cited by examiner

DETERMINING A DISTANCE BETWEEN A CAMERA AND A HITCH BALL

SUMMARY

Many vehicles today have some autonomous or semi-autonomous functionality. For example, vehicles may be able to park themselves in parking spaces, perform lane changes, maneuver around corners, or the like. Performing autonomous or semi-autonomous functionality becomes more difficult when a vehicle has a trailer attached. In some embodiments, to perform an autonomous or semi-autonomous operation for a vehicle with a trailer attached, an electronic processor connected to the vehicle must determine a position of a trailer relative to a camera connected to the vehicle. Often to determine the position of a trailer, the electronic processor utilizes images from a camera mounted to the vehicle and a position of the hitch ball. However, it is difficult to use images from a camera to determine the position of a hitch ball, especially when both the camera and the hitch ball are located at the horizontal center of the rear end of the vehicle. The position of the hitch ball relative to the camera may be determined based on the distance between the camera and the hitch ball.

Embodiments described herein provide, among other things, a system and method for determining a distance between a camera and a hitch ball.

One embodiment provides a system for determining a distance between a camera and a hitch ball of a vehicle. The system includes a camera configured to be mounted on a vehicle and an electronic processor connected to the camera. The electronic processor is configured to determine a first position and a second position associated with a point on a trailer, determine an angle of rotation between the first position and the second position, and using the first position, the second position, and the angle of rotation, determine a null space of a matrix. In one example, the matrix is defined as $$A = \begin{bmatrix} 1 & 0 & 0 & -cu_{xo} & cl_x \\ 0 & 1 & 0 & -cu_{y0} & cl_y \\ 0 & 0 & 0 & cu_{z0} & -cl_z \\ 0 & 0 & 1 & \frac{-cu_{z0}}{cu_{z1}}cu_{x1} & cl_x \\ -\cos\delta & \sin\delta & 1 & 0 & 0 \end{bmatrix}$$

and the null space of the matrix includes a value of a distance ($d_t$) between the camera and the hitch ball. The electronic processor is further configured to perform an autonomous or semi-autonomous vehicle operation based on the distance ($d_t$) between the camera and the hitch ball.

Another embodiment provides a method for determining a matrix for determining a distance between a camera and a hitch ball of a vehicle. The method includes breaking a first vector ($t_0$) from a hitch ball mounted to a vehicle to a first position and a second vector ($t_1$) from the hitch ball to a second position into three-dimensional coordinates to determine a first system of equations, wherein the first vector ($t_0$) from the hitch ball to the first position is a first unit vector ($cu_0$) from a camera mounted on the vehicle to the first position multiplied by a first distance ($d_0$) between the camera and the first position minus a third vector (L) from the camera to the hitch ball and the second vector ($t_1$) between the hitch ball and the second position is a second unit vector ($cu_1$) from the camera to the second position multiplied by a second distance ($d_1$) between the camera and the second position minus the third vector (L) from the camera to the hitch ball. The method also includes based on an assumption that the first position and the second position are at the same height, determining $d_1 = (d_0 * cu_{z0})/cu_{z1}$, substituting $d_1$ in the first system of equations for $(d_0 * cu_{z0})/cu_{z1}$ to determine a second system of equations, and determining a third system of equations by adding an equation to the second system of equations, wherein the equation is derived from a rotation matrix describing movement of the point from the first position to the second position by the angle of rotation. The method further includes, based on the third vector (L) from the camera to the hitch ball being a third unit vector ($cl_x cl_y cl_z$) multiplied by the distance ($d_t$) between the camera and the hitch ball, substituting $L_x$ in the third system of equations for $d_t cl_x$, $L_y$ in the third system of equations for $d_t cl_y$, and $L_z$ in the third system of equations for $d_t cl_z$ to determine a fourth system of equations. The method further includes, based on an assumption that the hitch ball is at the same height as the first position and the second position, substituting $t_z$ with 0 in the fourth system of equations and re-arranging equations in the fourth system of equations to determine a fifth system of equations. The method also includes, based on the fifth system of equations, determining a matrix for determining a distance between a camera and a hitch ball of a vehicle.

Yet another embodiment provides a method for determining a distance between a camera and a hitch ball of a vehicle. The method includes determining, using a camera mounted to the vehicle, a first position and a second position associated with a point on a trailer, determining an angle of rotation between the first position and the second position, and using the first position, the second position, and the angle of rotation, determining a null space of a matrix. In one example, the matrix is or is defined as $$A = \begin{bmatrix} 1 & 0 & 0 & -cu_{xo} & cl_x \\ 0 & 1 & 0 & -cu_{y0} & cl_y \\ 0 & 0 & 0 & cu_{z0} & -cl_z \\ 0 & 0 & 1 & \frac{-cu_{z0}}{cu_{z1}}cu_{x1} & cl_x \\ -\cos\delta & \sin\delta & 1 & 0 & 0 \end{bmatrix}$$

and the null space of the matrix includes a value of a distance ($d_t$) between the camera and the hitch ball. The method also includes performing an autonomous or semi-autonomous vehicle operation based on the distance ($d_t$) between the camera and the hitch ball.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components. It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
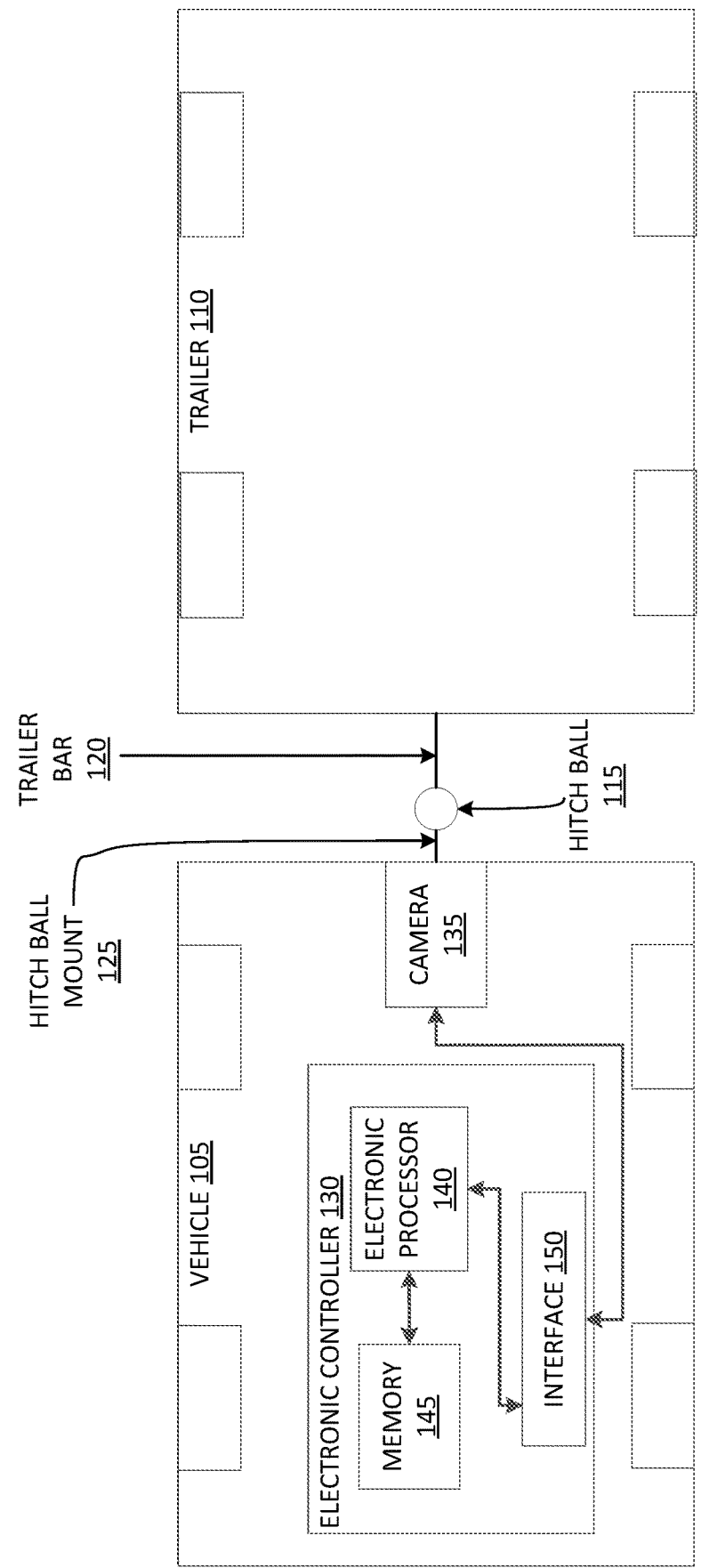
FIG. 1 is a block diagram of a system for determining a distance between a camera and a hitch ball according to one embodiment.

FIG. 1 illustrates one example of a system 100 for determining a distance between a camera and a hitch ball. The system 100 includes a vehicle 105 and a trailer 110. The vehicle 105, although illustrated as a four-wheeled vehicle, may encompass various types and designs of vehicles. For example, the vehicle 105 may be an automobile, a motorcycle, a truck, a bus, a semi-tractor, and others. The trailer 110 although illustrated as a four-wheeled trailer, may encompass various types and designs of trailers. For example, the trailer 110 may include two wheels instead of four or the trailer 110 may be shaped like a rectangle rather than a square. The vehicle 105 and the trailer 110 are connected via a hitch ball 115 that is mounted to the vehicle 105 and a trailer bar 120 that extends from the trailer 110. In some embodiments, the hitch ball 115 is connected to the rear end of the vehicle 105 via a hitch ball mount 125. In some embodiments, the hitch ball 115 is located at the horizontal center of the rear end of the vehicle 105.

In the example shown in FIG. 1, the vehicle 105 includes an electronic controller 130 and a camera 135. In the example shown, the electronic controller 130 includes a plurality of electrical and electronic components that provide power, operation control, and protection to the components and modules within the electronic controller 130. The electronic controller 130 includes, among other things, an electronic processor 140 (such as a programmable electronic microprocessor, microcontroller, or similar device), a memory 145 (for example, a non-transitory, machine readable medium), and an interface 150. The electronic processor 140 is communicatively connected to the memory 145 and the interface 150. In some embodiments, the electronic processor 140, in coordination with software stored in the memory 145 and information from the sensors, is configured to implement, among other things, the methods described herein.

The electronic controller 130 may be implemented in several independent controllers (for example, programmable electronic controllers) each configured to perform specific functions or sub-functions. Additionally, the electronic controller 130 may contain sub-modules that include additional electronic processors, memory, or application specific integrated circuits (ASICs) for handling communication functions, processing of signals, and application of the methods listed below. In other embodiments, the electronic controller 130 includes additional, fewer, or different components.

As illustrated in FIG. 1, the electronic processor 140 may communicate with the camera 135 via the interface 150. The camera 135 may be configured to capture images, video, or both. In some embodiments, the camera 135 is located at the rear end of the vehicle 105 and aligned with the hitch ball 115. In other words, the camera 135 and the hitch ball 115 are located at the same horizontal point on the rear end of the vehicle 105. In other embodiments, the camera 135 is horizontally offset from the hitch ball 115. While not illustrated in FIG. 1, in some embodiments, the vehicle 105 includes a speed sensor and a steering column sensor which communicate with the electronic processor 140 via the interface 150. The speed sensor may be mounted on a wheel axle and configured to measure the speed of the vehicle 105. The steering column sensor may be mounted on the steering column and configured to determine the rotational position of the steering column.

Figure 2:
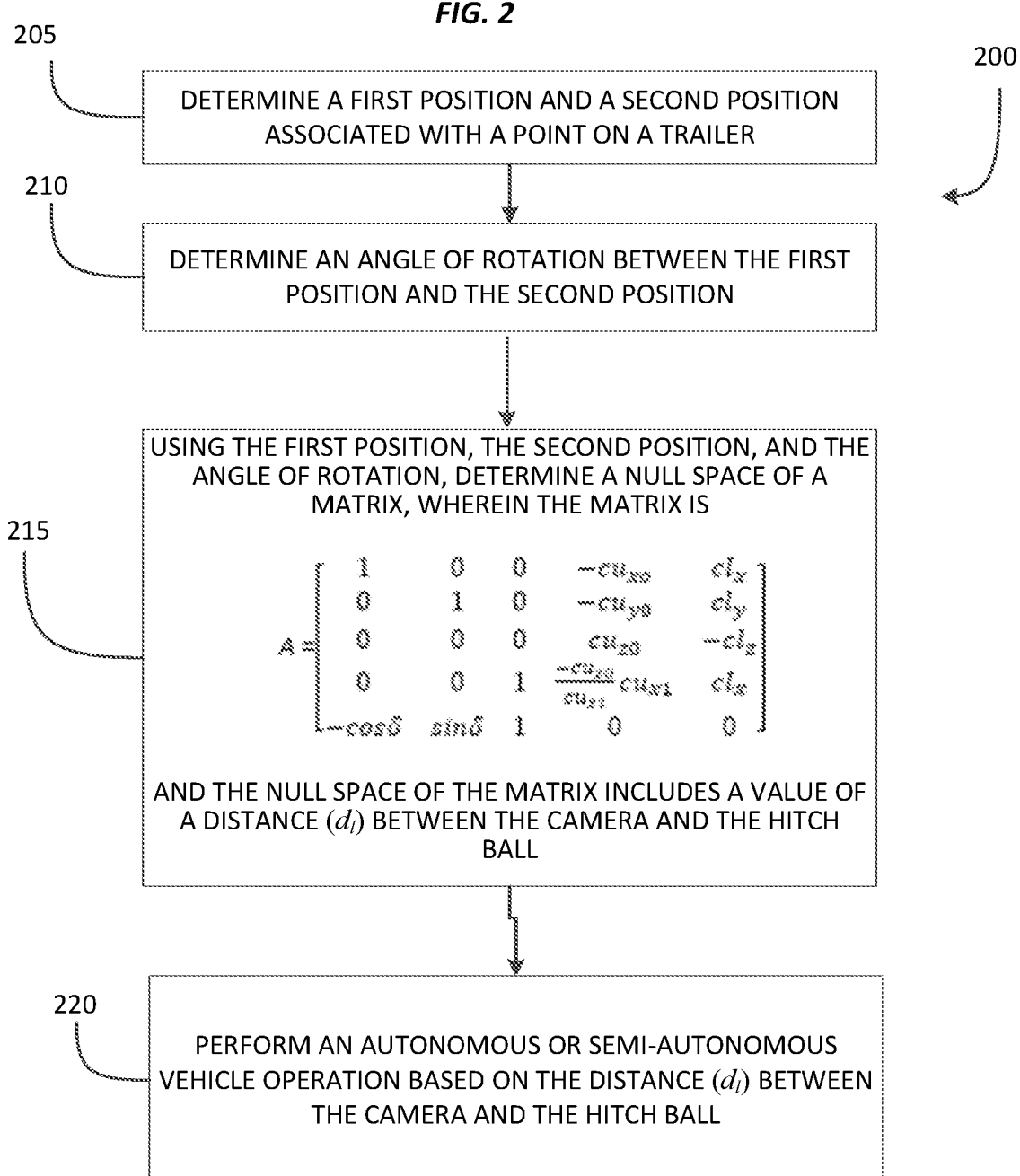
FIG. 2 illustrates a flow chart of a method for determining a distance between a camera and a hitch ball according to one embodiment.
Figure 3:
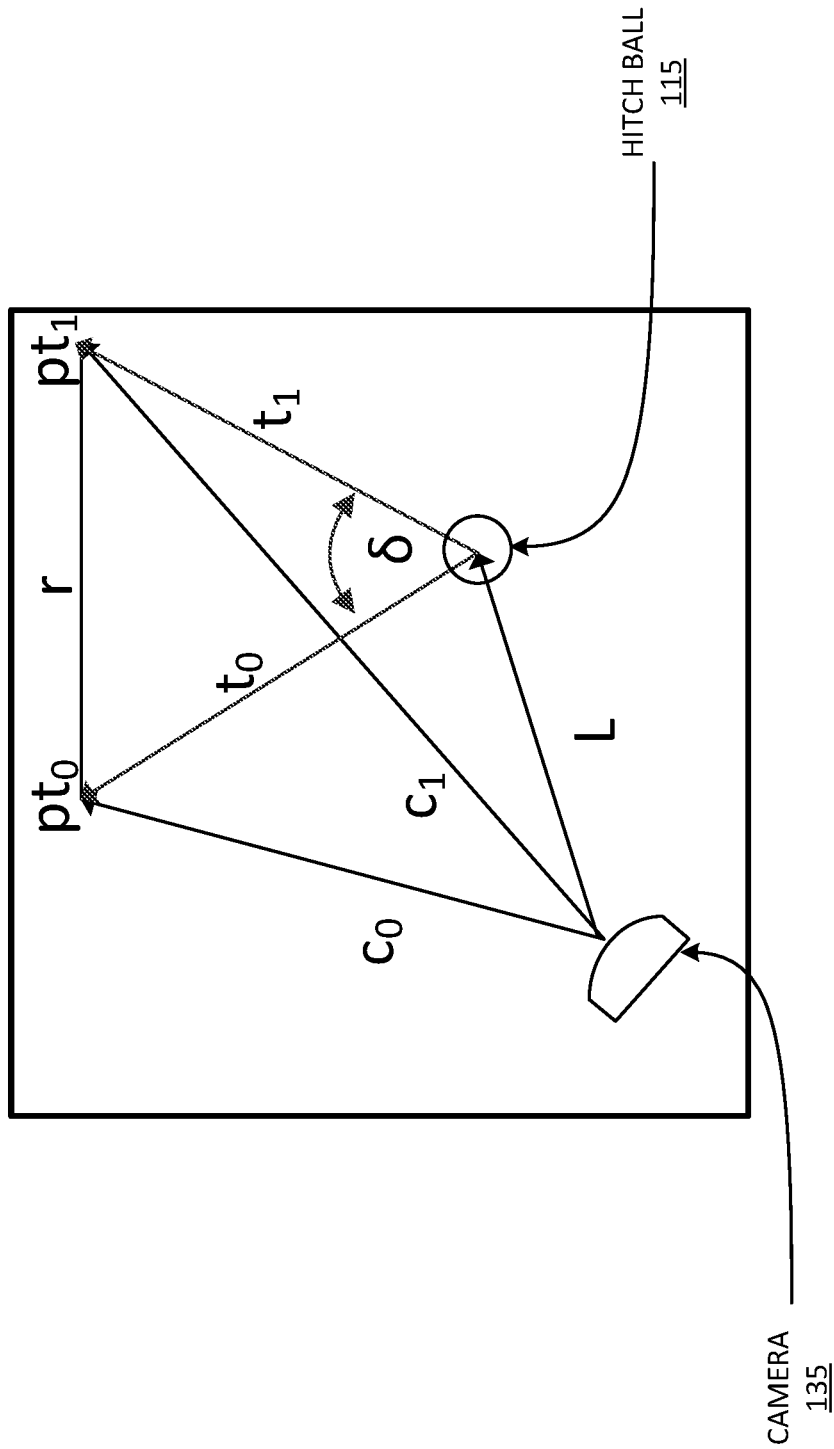
FIG. 3 is an illustrative example of the geometric relationships between components of the system of FIG. 1 at two positions.

FIG. 2 illustrates an example flowchart of a method 200 for determining a distance between a camera and a hitch ball. The method 200 begins at step 205 when the electronic processor 140 determines or receives a first position and a second position associated with a point on the trailer 110. In some embodiments, the point is a point on a body of the trailer 110. In other embodiments, the point is a point on a trailer bar 120 that connects the trailer body to the hitch ball 115. In some embodiments, the electronic processor 140 determines a first position and a second position associated with a point on the trailer 110 based on a first image and a second image received from the camera 135. In some embodiments, the camera 135 captures the first image and then captures the second image after the electronic processor 140 determines a change in the position of the steering column has occurred and the wheels of the vehicle 105 have rotated. In some embodiments, when the electronic processor 140 receives a first image, the electronic processor 140 outputs a prompt to a driver to turn the steering wheel of the vehicle 105 to the left or to the right and to drive the vehicle 105 forward or backward. In some embodiments, the prompt is in the form of an audio output via a speaker included in the vehicle 105, a visual output via a screen included in the vehicle 105, a combination of the foregoing, or the like. In some embodiments the electronic processor 140 uses image feature analysis to determine that the point is located at the first position in the first image and the second position in the second image. The electronic processor 140 may also use image feature analysis to determine that the second position is horizontally offset from the first position. FIG. 3 is an illustrative example of the geometric relationships between components of the system of FIG. 1 at two positions (the first position and the second position). In FIG. 3 the first position is illustrated as $pt_0$ and the second position is illustrated as $pt_1$.

At step 210, the electronic processor 140 determines or receives an angle of rotation between the first position ($pt_0$) and the second position ($pt_1$). In some embodiments, the electronic processor 140 uses image feature analysis to determine the angle of rotation. In other embodiments, the electronic processor 140 performs a calculation based on a change in steering angle (a change in the angular position of the steering column) and a change in velocity of the vehicle 105 from a time at which the first image is captured and to a time at which the second image is captured to determine the angle of rotation. In FIG. 3 the angle of rotation is illustrated as $\delta$.

At step 215, using the first position, the second position, and the angle of rotation, the electronic processor 140 determines the null space of a matrix. In some embodiments, the matrix is defined as $$A = \begin{bmatrix} 1 & 0 & 0 & -cu_{x0} & cl_x \\ 0 & 1 & 0 & -cu_{y0} & cl_y \\ 0 & 0 & 0 & cu_{z0} & -cl_z \\ 0 & 0 & 1 & \frac{-cu_{z0}}{cu_{z1}}cu_{x1} & cl_x \\ -\cos\delta & \sin\delta & 1 & 0 & 0 \end{bmatrix}$$

In some embodiments, the null space is:

$x = [t_{x0} t_{y0} t_{x1} d_0 d_l]$

In some embodiments, the null space includes a value of the distance ($d_l$) between the camera 135 and the hitch ball 115 and, by determining the null space, the electronic processor 140 determines the distance between the camera 135 and the hitch ball 115.

Figure 4A:
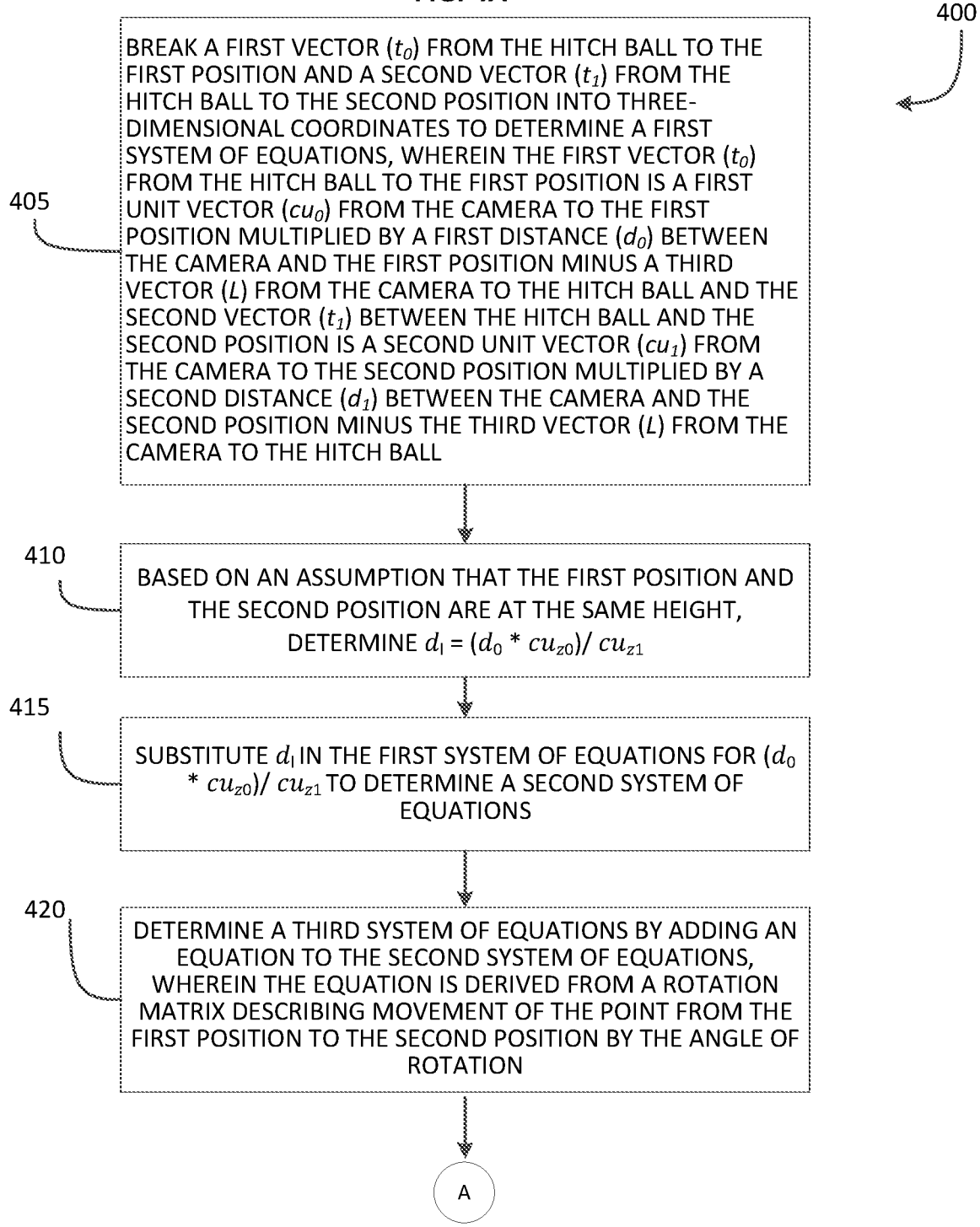
FIG. 4A and FIG. 4B illustrate an example flow chart of a method for determining a matrix for determining a distance between a camera and a hitch ball of a vehicle.
Figure 4B:
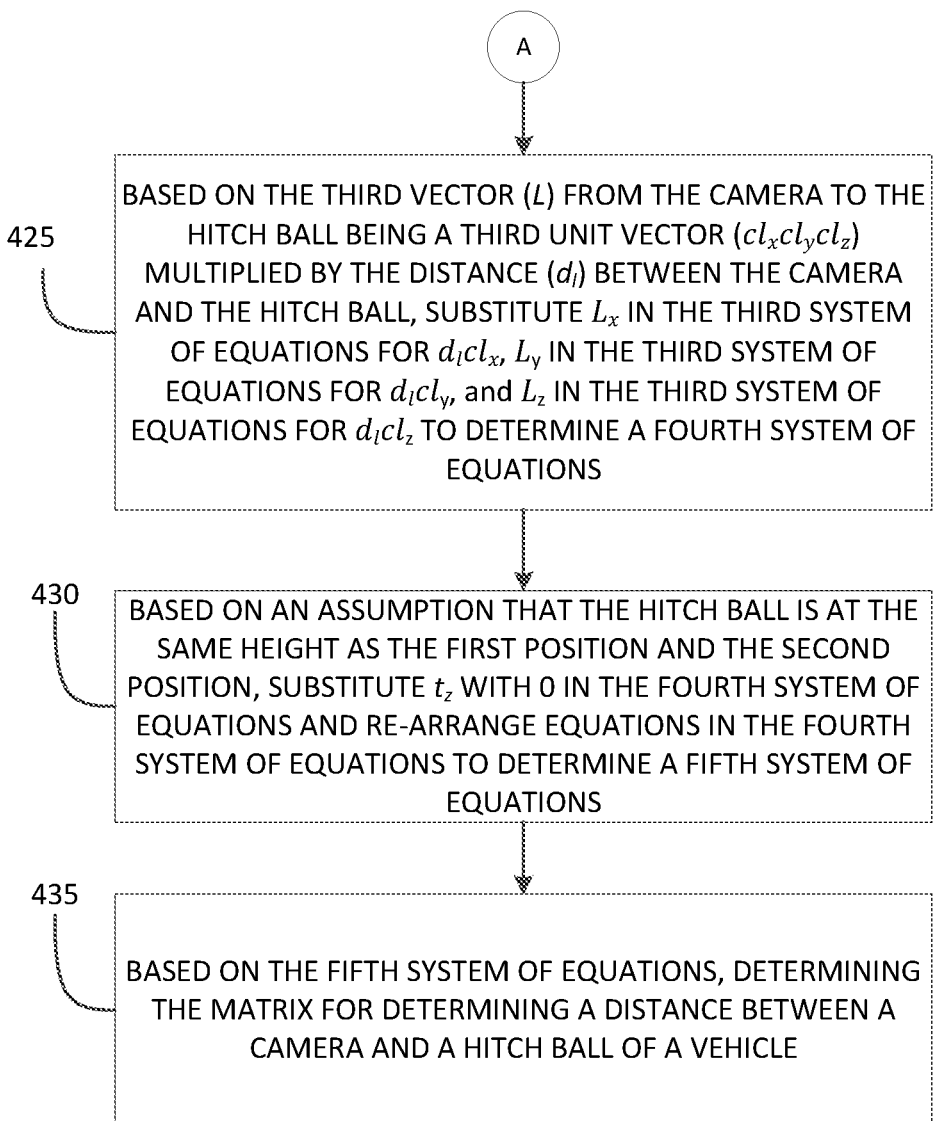

FIG. 4A and FIG. 4B illustrate an example method 400 of determining a matrix for determining a distance between a camera and a hitch ball of a vehicle (for example, the matrix described in step 215 of the method 200).

A first vector ($t_0$) from the hitch ball 115 to the first position ($pt_0$) can be described in terms of vector addition as $t_0 = c_0 - L$. As illustrated in FIG. 3, $c_0$ is a vector from the camera 135 to the first position ($pt_0$) and L is a third vector from the camera 135 to the hitch ball 115. A second vector from the hitch ball 115 to the second position ($pt_1$) can be described in terms of vector addition as $t_1 = c_1 - L$. As illustrated in FIG. 3, $c_1$ is the vector from the camera 135 to the second position ($pt_1$). The vector ($c_0$) from the camera 135 to the first position ($pt_0$) can be described as follows: $c_0 = cu_0 * d_0$. $cu_0$ is a first unit vector from the camera 135 to the first position ($pt_0$) and $d_0$ is an unknown first distance between the camera 135 and the first position ($pt_0$). The vector ($c_1$) from the camera 135 to the second position ($pt_1$) can be described as follows: $c_1 = cu_1 * d_1$. $cu_1$ is a second unit vector from the camera 135 to the second position ($pt_1$) and $d_1$ is an unknown second distance between the camera 135 and the second position ($pt_1$). Substituting $c_0$ for $cu_0 * d_0$ in the equation $t_0 = c_0 - L$ and $c_1$ for $cu_1 * d_1$ in the equation $t_1 = c_1 - L$ results in the following two equations:

$t_0 = d_0 * cu_0 - L$ $t_1 = d_1 * cu_1 - L$

In other words, the first vector ($t_0$) from the hitch ball 115 to the first position ($pt_0$) may be described as the first unit vector ($cu_0$) from the camera 135 to the first position ($pt_0$) multiplied by the first distance ($d_0$) between the camera 135 and the first position ($pt_0$) minus the third vector (L) from the camera 135 to the hitch ball 115. The second vector ($t_1$) between the hitch ball 115 and the second position ($pt_1$) may be described as the second unit vector ($cu_1$) from the camera 135 to the second position ($pt_1$) multiplied by the second distance ($d_1$) between the camera 135 and the second position ($pt_1$) minus the third vector (L) from the camera 135 to the hitch ball 115. In some embodiments, the first unit vector ($cu_0$) and the second unit vector ($cu_1$) may be determined using the focal length of the camera 135.

In some embodiments, the method 400 begins at step 405, when the first vector ($t_0$) from the hitch ball 115 to the first position ($pt_0$) and the second vector ($t_1$) from the hitch ball 115 to the second position ($pt_1$) are broken into three-dimensional coordinates to determine a first system of equations. In some embodiments, the first system of equations is:

$t_{x0} = d_0 * cu_{x0} - L_x$ $t_{y0} = d_0 * cu_{y0} - L_y$ $t_{z0} = d_0 * cu_{z0} - L_z$ $t_{x1} = d_1 * cu_{x1} - L_x$ $t_{y1} = d_1 * cu_{y1} - L_y$ $t_{z1} = d_1 * cu_{z1} - L_z$

At step 410, based on an assumption that the first position and the second position are at the same height, the method 400 includes determining $d_1 = (d_0 * cu_{z0})/cu_{z1}$. $d_1 = (d_0 * cu_{z0})/cu_{z1}$ is determined because if $t_{z0} = t_{z1}$, then, based on the first system of equations, $d_1 * cu_{z1} - L_z = d_0 * cu_{z0} - L_z$.

At step 415, $d_1$ is substituted in the first system of equations for $(d_0 * cu_{z0})/cu_{z1}$ to determine a second system of equations. In some embodiments, the second system of equations is:

$t_{x0} = d_0 cu_{x0} - L_x$ $t_{y0} = d_0 cu_{y0} - L_y$ $t_z = d_0 cu_{z0} - L_z$ $t_{x1} = ((d_0 cu_{z0})/cu_{z1}) cu_{x1} - L_x$

At step 420, a third system of equations is determined by adding an equation to the second system of equations. The equation that is being added to the second system of equations is derived from a rotation matrix describing movement of the point from the first position ($pt_0$) to the second position ($pt_1$) by the angle of rotation ($\beta$). In some embodiments, the rotation matrix is $$Rot = \begin{bmatrix} \cos\delta & -\sin\delta & 0 \\ \sin\delta & \cos\delta & 0 \\ 0 & 0 & 1 \end{bmatrix}$$

In the above rotation matrix, the first row corresponds to the x component of the second vector ($t_{x1}$), the second row corresponds to the y component of the second vector ($t_{y1}$), and the third row corresponds to the z component of the second vector ($t_{z1}$). Each column in the matrix corresponds to an unknown variable of the first vector ($t_0$). For example, the first column corresponds to the variable $t_{x0}$, the second column corresponds to the variable $t_{y0}$, and the third column corresponds to the variable $t_{z0}$. Each column includes the value that the variable the column corresponds to is multiplied by to describe second vector ($t_1$).

The second vector ($t_1$) may be described in terms of the rotation matrix as $t_1 = \text{Rot} * t_0$. By reducing the equation $t_1 = \text{Rot} * t_0$ to the x component, the electronic processor 140 determines the equation is $t_{x1} = t_{x0} \cos \delta - t_{y0} \sin \delta$. Therefore, in some embodiments, the third set of equations is:

$$t_{x0} = d_0 c u_{x0} - L_x$$

$$t_{y0} = d_0 c u_{y0} - L_y$$

$$t_z = d_0 c u_{z0} - L_z$$

$$t_{x1} = ((d_0 c u_{z0})/c u_{z1}) c u_{x1} - L_x$$

$$t_{x1} = t_{x0} \cos \delta - t_{y0} \sin \delta$$

At step 425, based on the third vector (L) from the camera 135 to the hitch ball 115 being a third unit vector ($cl_x, cl_y, cl_z$) multiplied by the distance ($d_f$) between the camera 135 and the hitch ball 115, $L_x$ is substituted in the third system of equations for $d_f cl_x$, $L_y$ in the third system of equations for $d_f cl_y$, and $L_z$ in the third system of equations for $d_f cl_z$ to determine a fourth system of equations. In some embodiments, the fourth system of equations is:

$$t_{x0} - d_0 c u_{x0} = -d_f cl_x$$

$$t_{y0} - d_0 c u_{y0} = -d_f cl_y$$

$$t_z = d_0 c u_{z0} - d_f cl_z$$

$$t_{x1} - ((d_0 c u_{z0})/c u_{z1}) c u_{x1} = -d_f cl_x$$

$$t_{x1} = t_{x0} \cos \delta - t_{y0} \sin \delta$$

At step 430, based on an assumption that the hitch ball 115 is at the same height as the first position ($pt_0$) and the second position ($pt_1$), $t_z$ is substituted with 0 in the fourth system of equations and re-arranges the equations in the fourth system of equations to determine a fifth system of equations with five unknowns. In some embodiments, the five unknowns are $t_{x0}$, $t_{y0}$, $t_{x1}$, $d_f$, and $d_0$. In some embodiments, the fifth system of equations is:

$$t_{x0} - d_0 c u_{x0} + d_f cl_x = 0$$

$$t_{y0} - d_0 c u_{y0} + d_f cl_y = 0$$

$$d_0 c u_{z0} - d_f cl_z = 0$$

$$t_{x1} - ((d_0 c u_{z0})/c u_{z1}) c u_{x1} + d_f cl_x = 0$$

$$t_{x0} \cos \delta + t_{y0} \sin \delta + t_{x1} = 0$$

At step 435, based on the fifth system of equations, the matrix is determined. As described above, in some embodiments, the matrix is $$A = \begin{bmatrix} 1 & 0 & 0 & -cu_{x0} & cl_x \\ 0 & 1 & 0 & -cu_{y0} & cl_y \\ 0 & 0 & 0 & cu_{z0} & -cl_z \\ 0 & 0 & 1 & \frac{-cu_{z0}}{cu_{z1}} cu_{x1} & cl_x \\ -\cos\delta & \sin\delta & 1 & 0 & 0 \end{bmatrix}$$

In the above matrix, each row corresponds to an equation included in the fifth system of equations. The first equation included in the fifth system of equations corresponds to the first row in the matrix, the second equation included in the fifth system of equations corresponds to the second row in the matrix, and so on. Each column in the matrix corresponds to an unknown variable in the fifth system of equations. For example, the first column of the matrix corresponds to the variable $t_{x0}$, the second column of the matrix corresponds to the variable $t_{y0}$, the third column of the matrix corresponds to the variable $t_{x1}$, the fourth column of the matrix corresponds to the variable $d_0$, the fifth column of the matrix corresponds to the variable $d_f$. Each column includes the value that the variable the column corresponds to is multiplied by in an equation. For example, in the first row, the first column includes '1' because in the first equation in the fifth system of equations includes $t_{x0}$. In the second row, the first column includes '0' because in the second equation in the fifth system of equations does not include $t_{x0}$. In the fifth row, the first column includes "$-\cos \delta$" because the fifth equation in the fifth system of equations includes $-t_{x0} \cos \delta$.

Returning to the method 200 included in FIG. 2, at step 220, the electronic processor 140 performs an autonomous or semi-autonomous vehicle operation based on the distance ($d_f$) between the camera 135 and the hitch ball 115. In some embodiments, in order to perform the autonomous or semi-autonomous vehicle operation, the electronic processor 140 uses the distance ($d_f$) to perform one or more calculations. For example, in some embodiments, the electronic processor 140 uses the distance ($d_f$) to determine the position of the hitch ball 115. In some embodiments, the electronic processor 140 determines the position of the hitch ball 115 by multiplying the third unit vector ($cl_x, cl_y, cl_z$) by the distance ($d_f$) between the camera 135 and the hitch ball 115. The electronic processor 140 may determine the third unit vector ($cl_x, cl_y, cl_z$) based on a focal length associated with the camera 135 and an offset of the camera 135 from the horizontal center of the rear end of the vehicle 105. In some embodiments, the electronic processor 140 may use the position of the hitch ball 115 to determine the position of the trailer 110.

In some embodiments, the autonomous or semi-autonomous vehicle operation is parking the trailer 110, maneuvering the trailer 110 around a corner while the vehicle 105 is moving forward, maneuvering the trailer 110 around a corner while the vehicle 105 is moving backward, moving the trailer 110 backward in a straight line (a straight back maneuver), making a 90-degree turn (left or right) with the trailer 110 while the vehicle 105 is driving backward, a combination of the foregoing, or the like.

Thus, the embodiments described herein provide, among other things, a system and a method for determining a distance between a camera and a hitch ball. Various features and advantages of the embodiments are set forth in the following claims.

What is claimed is:

1. A system for determining a distance, the system comprising:
   a camera configured to be mounted on a vehicle; and
   an electronic processor connected to the camera, the electronic processor configured to
   determine a first position and a second position of a point on a trailer;
   determine an angle of rotation between the first position and the second position;
   using the first position, the second position, and the angle of rotation, determine a null space of a matrix, wherein the matrix is defined as $$A = \begin{bmatrix} 1 & 0 & 0 & -cu_{xo} & cl_x \\ 0 & 1 & 0 & -cu_{y0} & cl_y \\ 0 & 0 & 0 & cu_{z0} & -cl_z \\ 0 & 0 & 1 & \dfrac{-cu_{z0}}{cu_{z1}} cu_{x1} & cl_x \\ -\cos\delta & \sin\delta & 1 & 0 & 0 \end{bmatrix}$$

and the null space of the matrix includes a value of the distance ($d_l$) between the camera and a hitch ball; and perform an autonomous or semi-autonomous vehicle operation based on the distance ($d_l$) between the camera and the hitch ball.

2. The system according to claim 1, wherein the electronic processor is further configured to determine a position of the hitch ball by multiplying a third unit vector ($cl_x cl_y cl_z$) by the distance between the camera and the hitch ball.

3. The system according to claim 1, wherein the camera is located at a horizontal center of a rear end of the vehicle.

4. The system according to claim 1, wherein the autonomous or semi-autonomous vehicle operation includes at least one selected from the group consisting of parking the trailer, maneuvering the trailer around a corner while the vehicle is moving forward, maneuvering the trailer around the corner while the vehicle is moving backward, moving the trailer backward in a straight line, and making a left or right 90-degree turn with the trailer while the vehicle is driving backward.

5. The system according to claim 1, wherein the point on the trailer includes one selected from the group consisting of a point on a body of the trailer and a point on a trailer bar.

6. The system according to claim 1, wherein the null space of the matrix is $x = [t_{x0} t_{y0} t_{xl} d_0 d_l]$.

7. A method for determining a distance, the method comprising:

breaking a first vector ($t_0$) from a hitch ball mounted to a vehicle to a first position and a second vector ($t_1$) from the hitch ball to a second position into three-dimensional coordinates to determine a first system of equations, wherein the first vector ($t_0$) from the hitch ball to the first position is a first unit vector ($cu_0$) from a camera mounted on the vehicle to the first position multiplied by a first distance ($d_0$) between the camera and the first position minus a third vector (L) from the camera to the hitch ball and the second vector ($t_l$) between the hitch ball and the second position is a second unit vector ($cu_l$) from the camera to the second position multiplied by a second distance ($d_l$) between the camera and the second position minus the third vector (L) from the camera to the hitch ball;

based on an assumption that the first position and the second position are at the same height, determining $d_l = (d_0 * cu_{z0}) / cu_{zl}$;

substituting $d_l$ in the first system of equations for $(d_0 * cu_{z0}) / cu_{zl}$ to determine a second system of equations;

determining a third system of equations by adding an equation to the second system of equations, wherein the equation is derived from a rotation matrix describing movement of the point from the first position to the second position by the angle of rotation;

based on the third vector (L) from the camera to the hitch ball being a third unit vector ($cl_x cl_y cl_z$) multiplied by the distance ($d_l$) between the camera and the hitch ball, substituting $L_x$ in the third system of equations for $d_l cl_x$, $L_y$ in the third system of equations for $d_l cl_y$, and $L_z$ in the third system of equations for $d_l cl_z$ to determine a fourth system of equations;

based on an assumption that the hitch ball is at the same height as the first position and the second position, substituting $t_z$ with 0 in the fourth system of equations and re-arranging equations in the fourth system of equations to determine a fifth system of equations; and based on the fifth system of equations, determine the distance between the camera and the hitch ball of the vehicle.

8. The method according to claim 7, wherein the first position and the second position are each a point on a trailer.

9. The method according to claim 7, the method further comprising:

determining the third unit vector ($cl_x cl_y cl_z$) based on a focal length of the camera and an offset of the camera from a horizontal center of a rear end of the vehicle; and determining a position of the hitch ball by multiplying the third unit vector ($cl_x cl_y cl_z$) by the distance ($d_l$) between the camera and the hitch ball.

10. The method according to claim 7, wherein the first system of equations is:

$t_{x0} = d_0 * cu_{x0} - L_x$ $t_{y0} = d_0 * cu_{y0} - L_y$ $t_{z0} = d_0 * cu_{z0} - L_z$ $t_{x1} = d_1 * cu_{x1} - L_x$ $t_{y1} = d_1 * cu_{y1} - L_y$ $t_{z1} = d_1 * cu_{z1} - L_z$ the second system of equations is:

$t_{x0} = d_0 cu_{x0} - L_x$ $t_{y0} = d_0 cu_{y0} - L_y$ $t_z = d_0 cu_{z0} - L_z$ $t_{x1} = ((d_0 cu_{z0})/cu_{z1}) cu_{x1} - L_x$ the third system of equations is:

$t_{x0} = d_0 cu_{x0} - L_x$ $t_{y0} = d_0 cu_{y0} - L_y$ $t_z = d_0 cu_{z0} - L_z$ $t_{x1} = ((d_0 cu_{z0})/cu_{z1}) cu_{x1} - L_x$ $t_{x1} = t_{x0} \cos\delta - t_{y0} \sin\delta$ the fourth system of equations is:

$t_{x0} - d_0 cu_{x0} = -d_l cl_x$ $t_{y0} - d_0 cu_{y0} = -d_l cl_y$ $t_z = d_0 cu_{z0} - d_l cl_z$ $t_{x1} - ((d_0 cu_{z0})/cu_{z1}) cu_{x1} = -d_l cl_x$ $t_{x1} = t_{x0} \cos\delta - t_{y0} \sin\delta$ and, the fifth system of equations is:

$t_{x0} - d_0 cu_{x0} + d_l cl_x = 0$ $t_{y0} - d_0 cu_{y0} + d_l cl_y = 0$ $d_0 cu_{z0} - d_l cl_z = 0$ $t_{x1} - ((d_0 cu_{z0})/cu_{z1}) cu_{x1} + d_l cl_x = 0$ $t_{x0} \cos \delta + t_{y0} \sin \delta + t_{x1} = 0$ 11. The method according to claim 7, further comprising a determining a matrix based on the fifth system of equations, wherein the matrix is $$A = \begin{bmatrix} 1 & 0 & 0 & -cu_{x0} & cl_x \\ 0 & 1 & 0 & -cu_{y0} & cl_y \\ 0 & 0 & 0 & cu_{z0} & -cl_z \\ 0 & 0 & 1 & \dfrac{-cu_{z0}}{cu_{z1}} cu_{x1} & cl_x \\ -\cos\delta & \sin\delta & 1 & 0 & 0 \end{bmatrix}.$$

12. A method for performing a vehicle operation based on a distance, the method comprising:
determining, using a camera mounted to a vehicle, a first position and a second position of a point on a trailer;
determining an angle of rotation between the first position and the second position;
using the first position, the second position, and the angle of rotation, determining a null space of a matrix, wherein the matrix is $$A = \begin{bmatrix} 1 & 0 & 0 & -cu_{x0} & cl_x \\ 0 & 1 & 0 & -cu_{y0} & cl_y \\ 0 & 0 & 0 & cu_{z0} & -cl_z \\ 0 & 0 & 1 & \dfrac{-cu_{z0}}{cu_{z1}} cu_{x1} & cl_x \\ -\cos\delta & \sin\delta & 1 & 0 & 0 \end{bmatrix}$$

and the null space of the matrix includes a value of the distance ($d_l$) between the camera and a hitch ball; and
performing an autonomous or semi-autonomous vehicle operation based on the distance ($d_l$) between the camera and the hitch ball.

13. The method according to claim 12, wherein the camera is located at a horizontal center of a rear end of the vehicle.

14. The method according to claim 12, wherein the autonomous or semi-autonomous vehicle operation includes at least one selected from the group consisting of parking the trailer, maneuvering the trailer around a corner while the vehicle is moving forward, maneuvering the trailer around the corner while the vehicle is moving backward, moving the trailer backward in a straight line, and making a left or right 90-degree turn with the trailer while the vehicle is driving backward.

15. The method according to claim 12, wherein the point on the trailer includes one selected from the group consisting of a point on a body of the trailer and a point on a trailer bar.

16. The method according to claim 12, the method comprising determining the matrix by
breaking a first vector ($t_0$) from the hitch ball to the first position and a second vector ($t_l$) from the hitch ball to the second position into three-dimensional coordinates to determine a first system of equations, wherein the first vector ($t_0$) from the hitch ball to the first position is a first unit vector ($cu_0$) from the camera to the first position multiplied by a first distance ($d_0$) between the camera and the first position minus a third vector (L) from the camera to the hitch ball and the second vector ($t_l$) between the hitch ball and the second position is a second unit vector ($cu_l$) from the camera to the second position multiplied by a second distance ($d_l$) between the camera and the second position minus the third vector (L) from the camera to the hitch ball;
based on an assumption that the first position and the second position are at the same height, determining $d_l = (d_0 * cu_{z0})/cu_{zl}$;
substituting $d_l$ in the first system of equations for $(d_0 * cu_{z0})/cu_{zl}$ to determine a second system of equations;
determining a third system of equations by adding an equation to the second system of equations, wherein the equation is derived from a rotation matrix describing movement of the point from the first position to the second position by the angle of rotation;
based on the third vector (L) from the camera to the hitch ball being a third unit vector ($cl_x cl_y cl_z$) multiplied by the distance ($d_l$) between the camera and the hitch ball, substituting $L_x$ in the third system of equations for $d_l cl_x$, $L_y$ in the third system of equations for $d_l cl_y$, and $L_z$ in the third system of equations for $d_l cl_z$ to determine a fourth system of equations;
based on an assumption that the hitch ball is at the same height as the first position and the second position, substituting $t_z$ with 0 in the fourth system of equations and re-arranging equations in the fourth system of equations to determine a fifth system of equations; and
based on the fifth system of equations, determining the matrix for determining the distance between the camera and the hitch ball of the vehicle.

17. The method according to claim 16, the method further comprising:
determining the third unit vector ($cl_x cl_y cl_z$) based on a focal length of the camera and an offset of the camera from a horizontal center of a rear end of the vehicle; and
determining a position of the hitch ball by multiplying the third unit vector ($cl_x cl_y cl_z$) by the distance ($d_l$) between the camera and the hitch ball.

18. The method according to claim 16, wherein the first system of equations is:

$t_{x0} = d_0 * cu_{x0} - L_x$ $t_{y0} = d_0 * cu_{y0} - L_y$ $t_{z0} = d_0 * cu_{z0} - L_z$ $t_{x1} = d_1 * cu_{x1} - L_x$ $t_{y1} = d_1 * cu_{y1} - L_y$ $t_{z1} = d_1 * cu_{z1} - L_z$ the second system of equations is:

$t_{x0} = d_0 cu_{x0} - L_x$ $t_{y0} = d_0 cu_{y0} - L_y$ $t_z = d_0 cu_{z0} - L_z$ $t_{x1} = ((d_0 cu_{z0})/cu_{z1}) cu_{x1} - L_x$ the third system of equations is:

$t_{x0} = d_0 cu_{x0} - L_x$ $t_{y0} = d_0 cu_{y0} - L_y$ $$t_z = d_0 cu_{z0} - L_z$$

$$t_{x1} = ((d_0 cu_{z0})/cu_{z1}) cu_{x1} - L_x$$

$$t_{x1} = t_{x0} \cos \delta - t_{y0} \sin \delta$$

the fourth system of equations is:

$$t_{x0} - d_0 cu_{x0} = -d_l cl_x$$

$$t_{y0} - d_0 cu_{y0} = -d_l cl_y$$

$$t_z = d_0 cu_{z0} - d_l cl_z$$

$$t_{x1} - ((d_0 cu_{z0})/cu_{z1}) cu_{x1} = -d_l cl_x$$

$$t_{x1} = t_{x0} \cos \delta - t_{y0} \sin \delta$$

and, the fifth system of equations is:

$$t_{x0} - d_0 cu_{x0} + d_l cl_x = 0$$

$$t_{y0} - d_0 cu_{y0} + d_l cl_y = 0$$

$$d_0 cu_{z0} - d_l cl_z = 0$$

$$t_{x1} - ((d_0 cu_{z0})/cu_{z1}) cu_{x1} + d_l cl_x = 0$$

$$t_{x0} \cos \delta + t_{y0} \sin \delta + t_{x1} = 0$$

19. The method according to claim 12, wherein the null space of the matrix is $$x = [t_{x0} t_{y0} t_{x1} d_0 d_l].$$

\* \* \* \* \*